United States Patent
Yang et al.

(10) Patent No.: US 7,519,201 B2
(45) Date of Patent: Apr. 14, 2009

(54) DETECTING HUMANS VIA THEIR POSE

(75) Inventors: Ming-Hsuan Yang, Sunnyvale, CA (US); Alessandro Bissacco, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 11/553,388

(22) Filed: Oct. 26, 2006

(65) Prior Publication Data

US 2007/0098254 A1 May 3, 2007

Related U.S. Application Data

(60) Provisional application No. 60/731,400, filed on Oct. 28, 2005.

(51) Int. Cl.
*G06K 9/00* (2006.01)
*G06K 9/62* (2006.01)

(52) U.S. Cl. ........................ 382/118; 382/228
(58) Field of Classification Search ................ 382/118, 382/155, 159, 160, 190, 203, 216, 224, 228
See application file for complete search history.

(56) References Cited

U.S. PATENT DOCUMENTS

| 7,194,114 | B2* | 3/2007 | Schneiderman | 382/118 |
| 2003/0058111 | A1* | 3/2003 | Lee et al. | 340/573.1 |
| 2003/0103647 | A1 | 6/2003 | Rui et al. | |
| 2003/0208289 | A1 | 11/2003 | Ben-Arie | |
| 2005/0129278 | A1 | 6/2005 | Rui et al. | |
| 2005/0147278 | A1 | 7/2005 | Rui et al. | |
| 2005/0188013 | A1 | 8/2005 | Rui et al. | |
| 2005/0210103 | A1 | 9/2005 | Rui et al. | |
| 2005/0226471 | A1 | 10/2005 | Singh et al. | |

FOREIGN PATENT DOCUMENTS

WO    WO 2005/096216    10/2005

OTHER PUBLICATIONS

Blei, D. M., et al., "Latent Dirichlet Allocation," Journal of Machine Learning Research (JMLR), 2003, pp. 993-1022, vol. 3.
Buntine, W., et al., "Applying Discrete PCA in Data Analysis," Helsinki Institute for Information Technology, Technical Report 2004-11, 2004, 8 pages.

(Continued)

*Primary Examiner*—Yon Couso
(74) *Attorney, Agent, or Firm*—Fenwick & West LLP; Mark Duell (57) ABSTRACT

A method and system efficiently and accurately detects humans in a test image and classifies their pose. In a training stage, a probabilistic model is derived in an unsupervised or semi-supervised manner such that at least some poses are not manually labeled. The model provides two sets of model parameters to describe the statistics of images containing humans and images of background scenes. In a testing stage, the probabilistic model is used to determine if a human is present in the image, and classify the human's pose based on the poses in the training images. A solution is efficiently provided to both human detection and pose classification by using the same probabilistic model to solve the problems.

23 Claims, 7 Drawing Sheets

OTHER PUBLICATIONS

Canny, J., "GaP: A Factor Model for Discrete Data," ACM SIGIR'04, Jul. 25-29, 2004, pp. 122-129.

Dalal, N., et al., "Histograms of Oriented Gradients for Human Detection," Proceedings of the IEEE Conference on Computer Vision and Pattern Recognition (CVPR), 2005, pp. 886-893.

Fergus, R., et al., "Learning Object Categories from Google's Image Search," Proceedings of the IEEE International Conference on Computer Vision (ICCV), 2005, pp. 1816-1823.

Gavrila, D. M., et al., "Real-Time Object Detection for "Smart" Vehicles," Proceedings of the IEEE International Conference on Computer Vision (ICCV), 1999, pp. 87-93.

Griffiths, T. L., "Finding Scientific Topics," Proceedings of the National Academy of Science, 2004, pp. 5228-5235.

Lowe, D. G., "Object Recognition from Local Scale-Invariant Features," Proceedings of the IEEE International Conference on Computer Vision (ICCV), Sep. 1999, pp. 1150-1157.

Mori, G., et al., "Recovering Human Body Configurations: Combining Segmentation and Recognition," Proceedings of the IEEE Conference on Computer Vision and Pattern Recognition (CVPR), 2004, pp. 326-333.

Ronfard, R., et al., "Learning to Parse Pictures of People," Proceedings of the European Conference on Computer Vision (ECCV), 2002, pp. 700-714.

Sigal, L., et al., "Attractive People: Assembling Loose-Limbed Models Using Non-Parametric Belief Propagation," Proceedings, Neural Information Processing Systems (NIPS), 2003, pp. 1539-1546.

Sivic, J., et al., "Discovering Object Categories in Image Collections," Proceedings of the IEEE International Conference on Computer Vision (ICCV), Computer Science and Artificial Intelligence Laboratory Technical Report, MIT-CSAIL-TR-2005-012, AIM-2005-005, Nov. 1, 2004, Updated Feb. 18, 2005, pp. 734-741.

Viola, P., "Detecting Pedestrians Using Patterns of Motion and Appearance," Proceedings of the IEEE International Conference on Computer Vision (ICCV), 2003, pp. 734-741.

Weber, M., et al., "Towards Automatic Discovery of Object Categories," Proceedings of the IEEE Conference on Computer Vision and Pattern Recognition (CVPR), 2000, pp. 2101-2108.

Rubio, J. M. B., et al., "A New Method for Detection and Initial Pose Estimation Based on Mumford-Shah Segmentation Functional," Universitat de les Illes Balears, Departament de Ciències Matemàtiques i Informàtica, [online] [retrieved on Dec. 23, 2005] Retrieved from the Internet: <URL: http://dmi.uib.es/~ugiv/papers/134-JoseMariaBuadesRubio.pdf>.

* cited by examiner

DETECTING HUMANS VIA THEIR POSE

RELATED APPLICATIONS

This application claims priority from U.S. provisional application No. 60/731,400 filed Oct. 28, 2005 entitled "Detecting Humans Via Their Pose" which is incorporated by reference herein in its entirety.

FIELD OF THE INVENTION

The invention relates to computer vision, and more particularly, to detecting humans in an image and estimating their pose.

BACKGROUND OF THE INVENTION

Detecting humans and estimating their poses from a single image is a fundamental problem for a range of applications, such as image retrieval and understanding. While humans are capable of easily determining the locations and poses from visual information contained in photographs, it is difficult to represent image data in a way that allows machines to successfully make this determination. The related problems of detecting humans and classifying their pose have conventionally been approached separately with each problem presenting significant challenges to researchers.

Traditional research focuses on deriving an automatic procedure that locates the regions of a two dimensional image that contain human bodies in an arbitrary pose. The human detection problem is hard because of the wide variability that images of humans exhibit. Given that it is impractical to explicitly model nuisance factors such as clothing, lighting conditions, viewpoint, body pose, partial and/or self occlusions, one can learn a descriptive model of human/non human statistics. The problem then reduces to a binary classification task for which general statistical learning techniques can be directly applied. Consequently, the main focus of research on human detection has traditionally been on deriving a suitable representation, i.e., one that is most insensitive to typical appearance variations, so that it provides good features to a standard classifier.

Numerous representation schemes have traditionally been exploited for human detection, e.g., Haar wavelets, edges, gradients and second derivatives, and regions from image segmentation. With these representations, algorithms have been applied for the detection process such as template matching, support vector machine, Adaboost, and grouping, to name a few. Examples of these techniques are set forth in Gavrila, D. M. and V. Philomin, *Real-time Object Detection for Smart Vehicles,* Proc. ICCV, pages 87-93, 1999; Ronfard, R., et al., *Learning to Parse Pictures of People.* Proc. ECCV, pages 700-714, 2002; Viola, P., et al., *Detecting Pedestrians Using Patterns of Motion and Appearance.* Proc. ICCV, pages 734-741, 2003; and Mori, G., et al., *Recovering Human Body Configurations: Combining Segmentation and Recognition.* Proc. CVPR, pages 326-333, 2004, which are all incorporated by reference herein in their entirety.

Recently local descriptors based on histograms of gradient orientations have proven to be particularly successful for human detection tasks. The main idea is to use distributions of gradient orientations in order to be insensitive to color, brightness and contrast changes and, to some extent, local deformations. However, conventional models still generally fail to account for more macroscopic variations, due for example to changes in pose.

The problem of classifying human pose presents its own challenges. Humans are highly articulated objects with many degrees of freedom, which makes defining pose classes a difficult problem. Even with manual labeling, it is difficult to judge the distance between two poses or cluster them. Most conventional approaches to pose estimation are based on body part detectors, using either edge, shape, color and texture cues, or learned from training data. The optimal configuration of the part assembly is then computed using dynamic programming or by performing inference on a generative probabilistic model, using either Data Driven Markov Chain Monte Carlo, Belief Propagation or its non-Gaussian extensions as described by Sigal, L., et al., *Attractive People: Assembling Loose-Limbed Models Using Non-Parametric Belief Propagation,* NIPS, pages 1539-1546, 2003 which is incorporated by reference herein in its entirety.

The approaches above focus on only one of the two problems, either detection or pose estimation. In human detection, since a simple yes/no answer is often desired, there is little or no advantage to introducing a complex model with latent variables associated to physical quantities. In pose estimation, on the other hand, the goal is to infer these quantities and therefore a full generative model is a natural approach. Thus, human detection and pose estimation conventionally require computing two entirely different models and solving the problems in a completely independent manner. Further, using conventional techniques, the pose estimation problem cannot even be approached unless there is prior knowledge the image contains a human. If solutions to both the problems of human detection and pose estimation are needed, conventional techniques are inefficient and require significant computational cost.

What is needed is a method for efficiently performing human detection and pose classification from a single derived probabilistic model.

SUMMARY OF THE INVENTION

The system and method described within bridges the gap between the two problems of human detection and pose estimation by simultaneously performing detection and pose classification from a single probabilistic model. In a training stage, a probabilistic model is derived. This model is generated based on a series of training images containing human and non-human images. Once the model is derived, human detection may be performed on a test image based on the probabilistic model. If a human is detected in the image, the human's pose is classified based on the probabilistic model.

An image representation using descriptors based on histograms is used and a probabilistic model is derived for it. In one embodiment, the probabilistic model is derived using an unsupervised method. In unsupervised training, there is no manual labeling of the training images. In an alternative embodiment, the model is derived using a semi-supervised method in which only a portion of the training images are manually labeled. The derived probabilistic model clusters images of humans and provides a low dimensional representation encoding essential information of their pose. The chief difference with standard clustering or dimensionality reduction techniques is that a full probabilistic framework is derived, which provides principled ways to combine and compare different models, as required for tasks such as human detection, pose classification and matching. Based on the probabilistic model the system can successfully detect humans in a test image and classify their poses.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
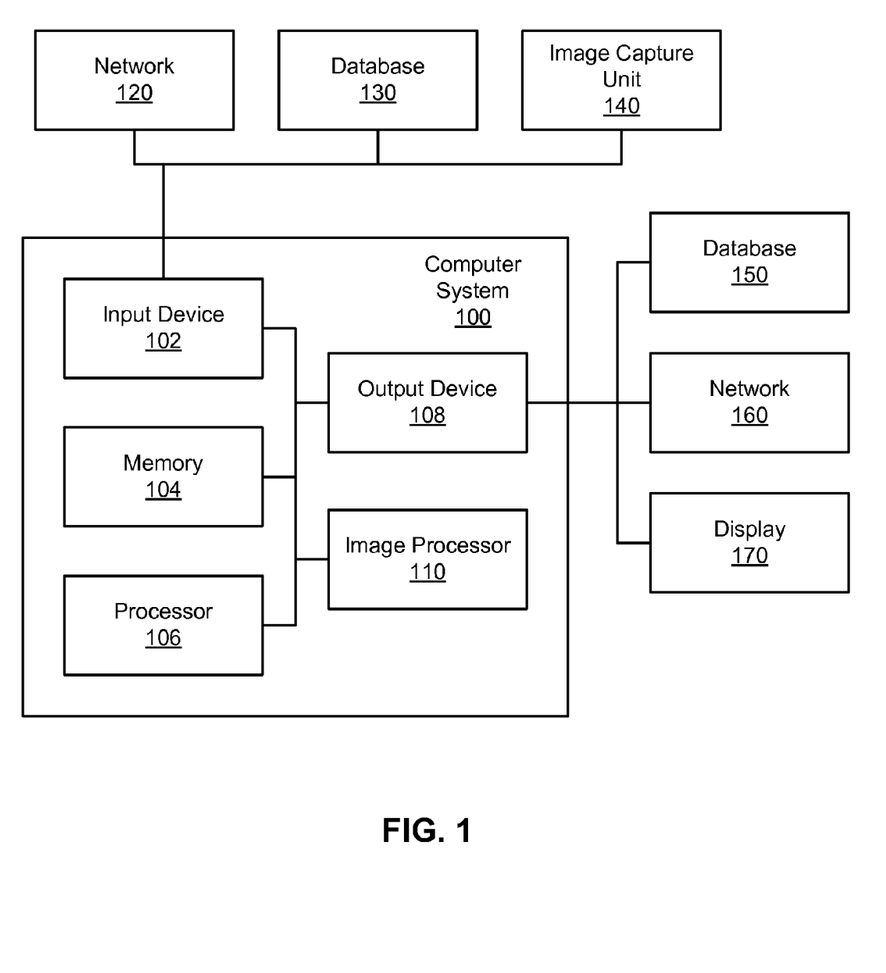
FIG. 1 is an example of a computer system for executing the methods of the present invention.

FIG. 1 is a computer system according to one embodiment of the present invention. The computer system 100 comprises an input device 102, a memory 104, a processor 106, an output device 108, and an image processor 110. The input device 102 is coupled to a network 120, a database 130, and an image capture unit 140. The output device 108 is coupled to a database 150, a network 160, and a display 170. In other embodiments, the input device is connected to only one or two of a network 120, a database 130, and an image capture unit 140. In yet another embodiment, the input device may be connected to any device configured to input data to the computer system. Similarly, in some embodiments, the output device may be connected to one or more of a database 150, network 160, display 170 or any other device cable of receiving outputted data. In another embodiment, the computer system comprises one or more of a processor 106, an image processor 110, or other specialized processor.

Figure 2:
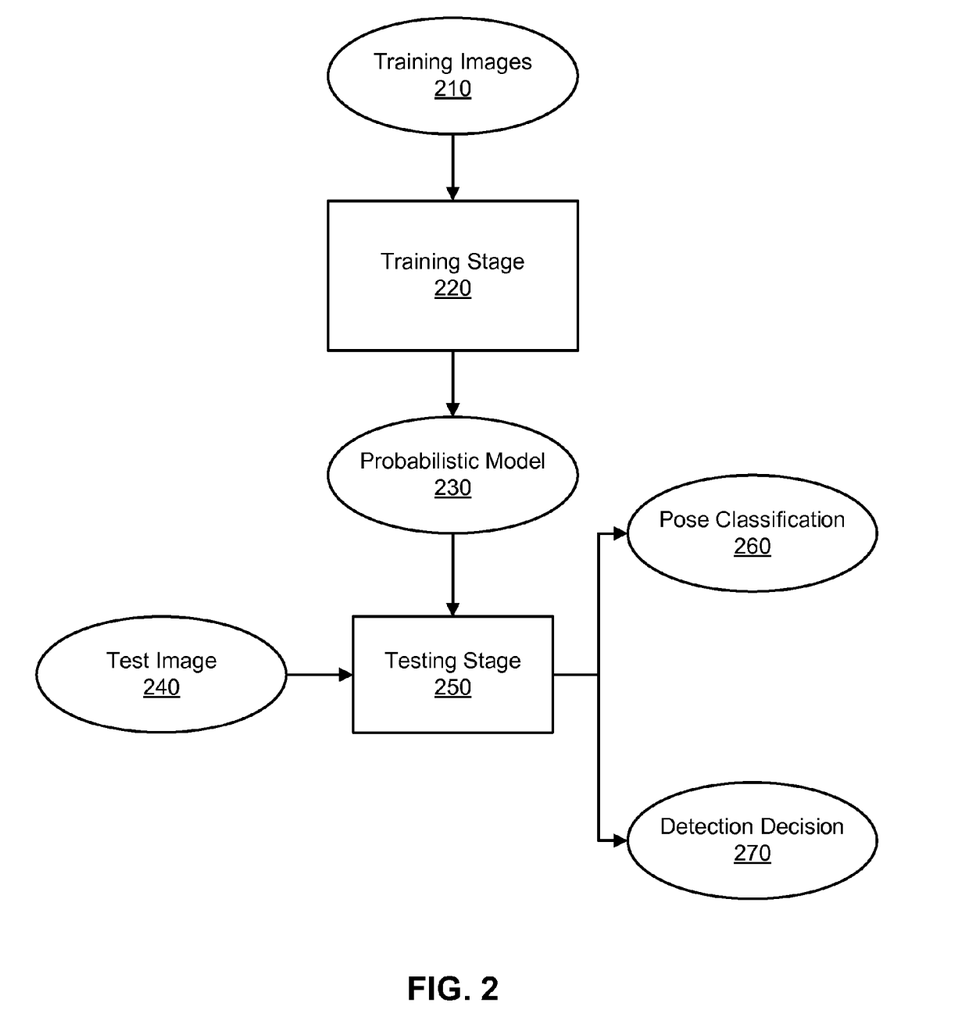
FIG. 2 is an input/output diagram in accordance with one embodiment of the present invention.

FIG. 2 illustrates an input/output diagram in accordance with one embodiment of the present invention. In a training stage 220, the computer system 100 receives training images 210 and generates a probabilistic model 230 that describes the statistics of the training images. In a testing stage 250, the computer system 100 receives a test image and outputs a detection decision 270 indicating if a human is present in the image. If the system detects a human, a pose classification 260 is also outputted. The determinations made in the testing stage are based at least in part on the probabilistic model 230.

The training images consist of, for example, a set of images of humans in various poses (positive images) and a set of images of scenes not containing humans (negative images). In one embodiment, the training is unsupervised. In unsupervised training, poses in the positive training images are not manually classified. In an alternate embodiment, the training is semi-supervised. In semi-supervised training at least one pose in the training set is manually labeled (by a human, for example) while other poses are not manually labeled. Additional details regarding unsupervised training can be found in Weber, M., et al., *Toward Automatic Discovery of Object Categories*. Proc. CVPR, pages 2101-2108, 2000 which is incorporated by reference herein in its entirety.

Figure 3:
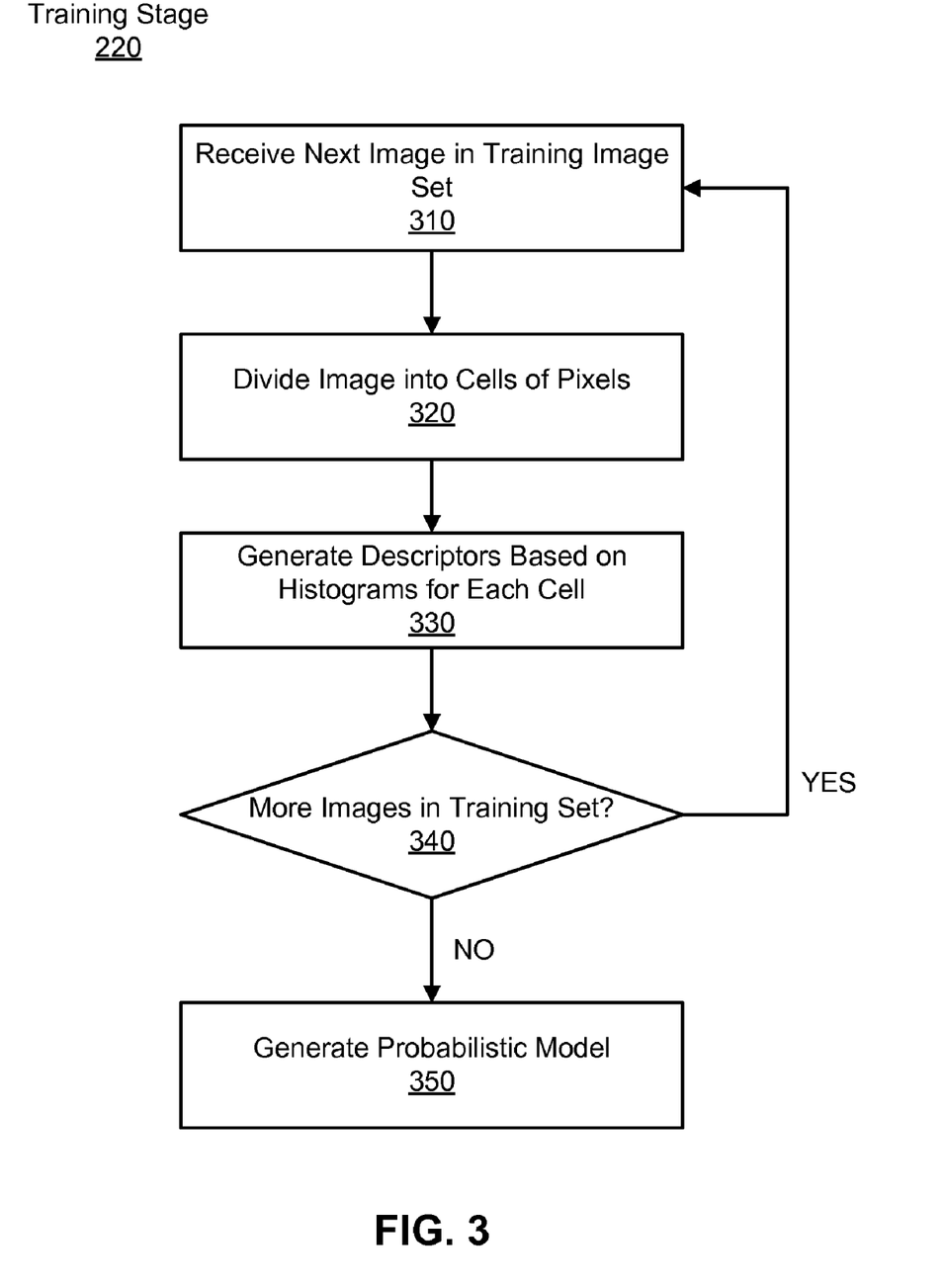
FIG. 3 a flow diagram illustrating a training stage for generating a probabilistic model for human detection and pose classification in accordance with one embodiment of the present stage.

FIG. 3 illustrates an example embodiment of the training stage 220. The computer system 100 receives 310 the next image in the training image set 210. The training images 210 may be acquired by the computer system 100 through an input device 102 interfaced to a network 120, database 130, image capture unit 140, or other input system. The image is then divided 320 into cells of pixels. For example, a patch of 64×128 pixels may be divided into 8×8 cells. For each cell, a local descriptor based on histograms is computed 330. In one embodiment, a histogram of oriented gradients provides the local descriptor. The histogram of oriented gradients represents a quantization of gradient orientations. In an alternate embodiment, a different descriptor based on histograms may be used to represent the images.

Figure 5:
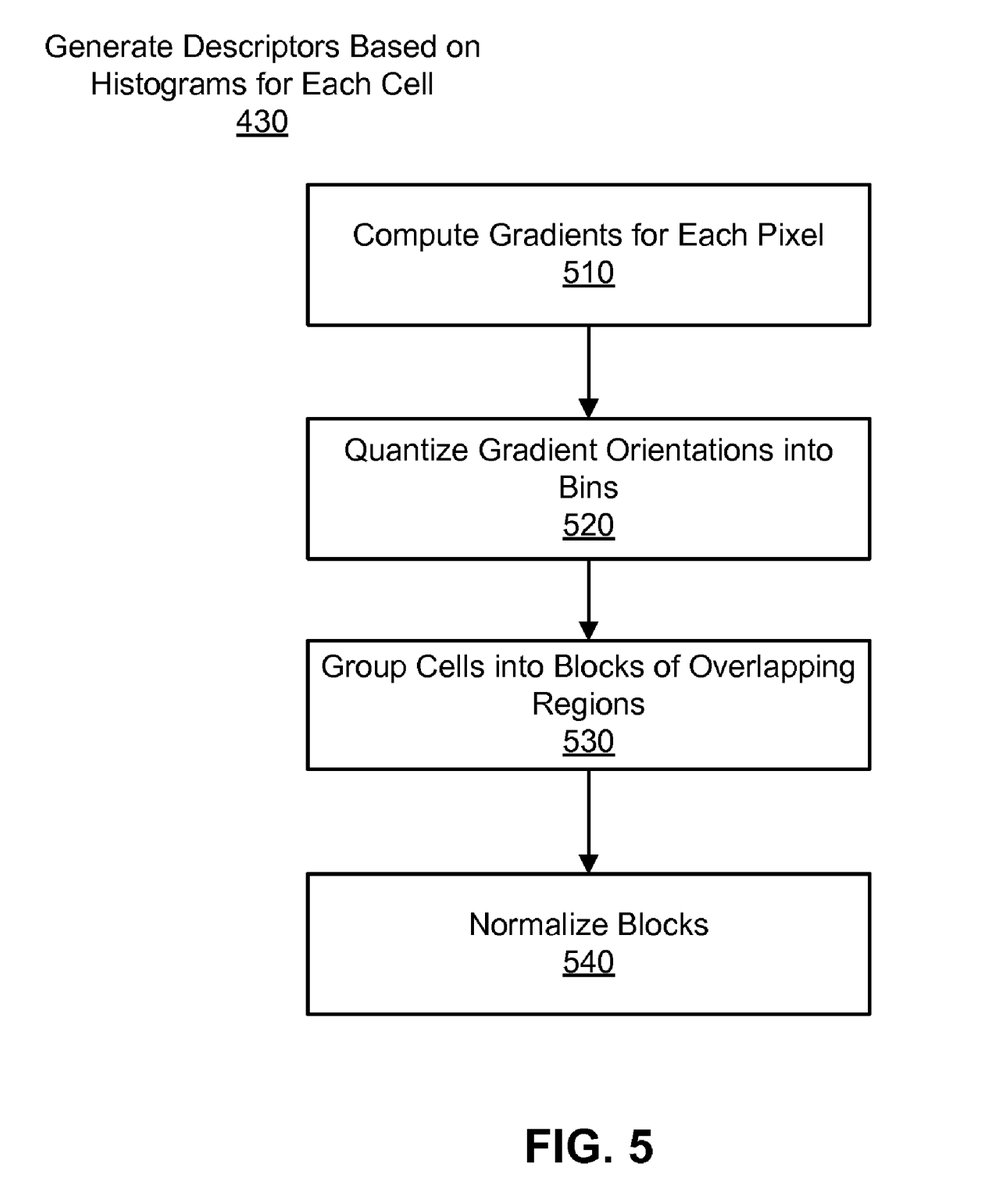
FIG. 5 is a flow diagram illustrating a method for generating descriptors based on histograms in accordance with one embodiment of the present invention.

FIG. 5 illustrates an example embodiment of a method for generating 330 the descriptors for each cell. In one embodiment, histograms of oriented gradients are used as representations for image-based detection and matching as described in Lowe, D. G., *Object Recognition from Local Scale-Invariant Features*, Proc. ICCV, pages 1150-1157, 1999; and Dalal, N., and B. Triggs, *Histograms of Oriented Gradients for Human Detection*, Proc. CVPR, pages 886-893, 2005 both of which are incorporated by reference herein in their entirety. A gradient is computed 510 for each pixel comprising a magnitude and orientation. Histograms are generated by quantizing 520 the gradients into bins based on their orientations and magnitudes. Each bin represents the intensity of the gradient at a particular location, defined by a range of orientations and a local neighborhood (cell). The bin height denotes the strength and number of the edges in the cell. In an example embodiment, orientations are quantized into 9 bins in the range 0°-180°. Each pixel contributes to the neighboring bins, both in orientation and space, by an amount proportional to the gradient magnitude and linearly decreasing with the distance from the bin center. These cells are grouped 530 into blocks of overlapping regions, and the contribution of each pixel may also be weighted by a Gaussian kernel. For example, cells may be grouped into in 2×2 blocks and weighted by a Gaussian kernel with $\sigma=8$, centered in the block. Finally, the vectors v of cell histograms within one block are normalized 540 for brightness and contrast changes. For example, the vectors may be normalized in $L_2$ norm: $v/(\|v\|_2+\epsilon)$. The final descriptor is a collection of histograms from overlapping blocks (each cell shared by 4 blocks, for example). The main characteristic of such a representation is robustness to local deformations, illumination changes and, to a limited extent, viewpoint and pose changes due to coarsening of the histograms.

Turning back to FIG. 3, if 340 there are more images in the training set 210 the process repeats for the next training image until representations of all images are computed. Once all images in the training set are processed, a probabilistic model 230 is generated 350 based on the image representations to describe the generation process of the image features. The probabilistic model classifies a pose in as a linear combination of poses from the training images. In one embodiment, Latent Dirichlet Allocation (LDA) generates the probabilistic model 120.

In deriving a generative model for this class of features it is noted that, since they represent a weighted histogram, they have non-negative elements. Thus a proper generative model for these descriptors imposes non-negativity constraints. In an example embodiment, the probabilistic model is generated 350 by applying a Latent Dirichlet Allocation (LDA) as described in Blei, D. M., et al., *Latent Dirichlet Allocation*, JMLR, 3:993-1022, 2003 which is incorporated by reference in its entirety. LDA has been introduced in the text analysis context, but has also been applied to the problem of recognition of object classes as described in Fergus, R., et al., *Learning Object Categories From Google's Image Search*, Proc. ICCV, pages 1816-1823, 2005; and Sivic, J., et al., *Discovering Object Categories in Image Collections*, Proc. ICCV, pages 734-741, 2003 which are incorporated herein by reference in their entirety.

Latent Dirichlet Allocation (LDA) is a hierarchical model for sparse discrete mixture distributions, where the basic elements (words) are sampled from a mixture of component distributions, and each component defines a discrete distribution over the set of words. The main characteristic of such a model is that the contributions from each component combine additively (the total count for each word equals the sum of counts from each component), whereas in standard mixture models all the words are assigned exclusively to one component.

LDA is based on a collection of documents where words w, the basic units of the data, take values in a dictionary of W unique elements $w \in \{1, \ldots, W\}$. A document $w=(w_1, w_2, \ldots, w_W)$ is a collection of word counts $w_j$ $$\sum_{j=1}^{W} w_j = N.$$

The standard LDA model does not include the distribution of N, so it can be omitted in what follows. The corpus $D=\{w_1, w_2, \ldots, w_M\}$ is a collection of M documents. The LDA model introduces a set of K latent variables, called topics. Each word in the document is assumed to be generated by one of the topics.

Figure 6:
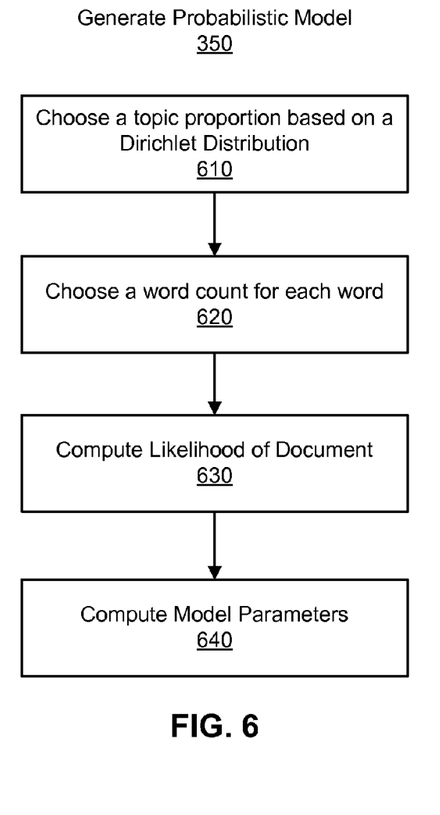
FIG. 6 is a flow diagram illustrating a method for generating a probabilistic model for use in human detection and pose classification in accordance with one embodiment of the present invention.

FIG. 6 describes an example embodiment of the generative process for each document w in the corpus under the LDA model. The system chooses 610 a topic distribution, $\theta \sim \text{Dirichlet}(\alpha)$. That is, a sample $\theta$ is drawn from a Dirichlet distribution with parameter $\alpha$. For each word $j=1,\ldots,W$ in the dictionary, a word count, $w_j \sim p(w_j|\theta, \beta)$ is chosen 620 by drawing a sample, $w_j$, from the distribution, p, parameterized by $\theta$ and $\beta$. The hyperparameter $\alpha \in R_+^K$ represents the prior on the topic distribution, $\theta \in R_+^K$ are the topic proportions, and $\beta \in R_+^{W \times K}$ are the parameters of the word distributions conditioned on topics. In one embodiment, the word counts $w_j$ are drawn from a discrete distribution conditioned on the topic proportions $\theta$:$p(w_j|\theta, \beta)=\beta_j.\theta$. In another embodiment, the discrete distributions are replaced by multinomials as described in Buntine, W., and A. Jakulin., *Applying Discrete PCA in Data Analysis*. Technical Report 2004-11, Helsinki Institute for Information Technology, 2004, which is incorporated by reference herein in its entirety. In yet another embodiment, the number of words $0_i$ from each component are independent Gamma samples and $p(w_j|\theta, \beta)$ is Poisson as described in Canny, J. *GaP: a Factor Model For Descrete Data*. ACM SIGIR pages 122-129, 2004 which is incorporated by reference herein in its entirety.

It is assumed that the topic distributions $\beta$ are deterministic parameters in order to estimate the parameters of the model that best fit the training data. In one embodiment, the most probable values of the parameters are computed given a prior distribution and the training data. For example, the most probable value of the topic distributions $\beta$ may be estimated using a Dirichlet distribution as a prior with parameter $\eta$. Once the parameters are learned, the parameters may be used to infer the most likely topics of a given test sample.

The likelihood of a document w is computed 630 by $$p(w|\alpha, \beta) = \int p(\theta|\alpha) \prod_{n=1}^{W} p(w_n|\theta, \beta) d\theta \quad (1)$$

where documents are represented as a continuous mixture distribution. The advantage over standard mixture of discrete distributions is that this model allows each document to be generated by more than one topic.

The LDA framework may be directly applied to images by quantizing histogram bins and assigning a unique word to each bin. An orientation histogram computed on an image patch is a document w represented as a bag of words $(w_1, \ldots, w_W)$, where the word counts $w_j$ are the bin heights. Continuing with the analogy, a document corresponds to an image and a corpus corresponds to a set of images. For example, one corpus may correspond to the set of positive images and another corpus corresponds to set of negative images. The histogram is generated by a mixture of basic components (topics), where each topic z induces a discrete distribution $p(r|\beta_z)$ on bins representing a typical configuration of edges common to a class of elements in the dataset. Summing the contributions from each topic obtains the total count $w_j$ for each bin, distributed according to $p(w_j|\theta, \beta)$.

The main property of such feature formation process is that topics combine additively. That is, the same bin may have contributions from multiple topics, and this models the fact that the bin height is the count of edges in a neighborhood which may include parts generated by different components. Assigning a unique word to each bin models spatial information encoded in the word identity. Most conventional approaches using similar probabilistic models for object class recognition do not exploit this kind of information.

Figure 7:
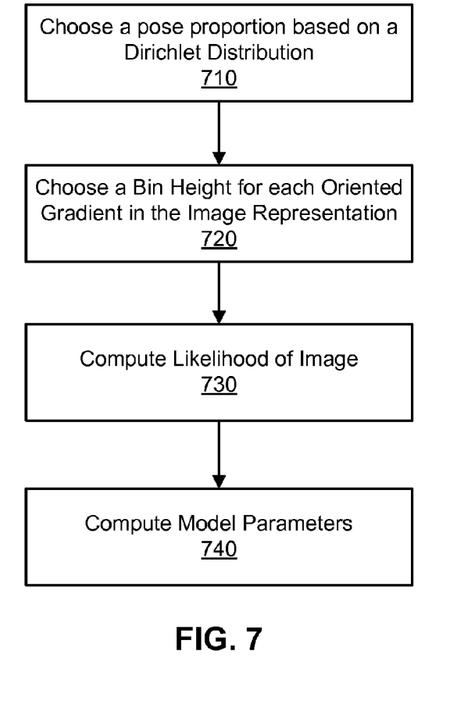
FIG. 7 is a flow diagram illustrating a method for generating a probabilistic model for use in human detection and pose classification in accordance with one embodiment of the present invention.

It should be understood that references herein relating to document analysis techniques can be similarly applied to image analysis based on the analogy above. For example, FIG. 7 illustrates an embodiment of the LDA model for image modeling analogous to the steps in FIG. 6 for text analysis. A pose proportion is first chosen 710 based on a Dirichlet distribution, where the pose corresponds to the topic described above. Then, a bin height is chosen 720 for each orientation gradient in the image representation. Next the likelihood calculation is computed for the image (analogous to a document) as in Eq. 1. The model parameters are then computed 740 using a similar technique to document analysis described below.

The model parameters are computed 640 based on the training corpus using an inference algorithm. In training, model parameters are computed separately for the set of positive images containing humans and the set of negative images containing only background scenes. In one embodiment, a mean field or variational inference is applied for extracting model parameters. In another embodiment, Gibbs sampling is applied as described in Griffiths, T. L., *Finding Scientific Topics*, Proc. National Academy of Science, pages 5228-5235, 2004 which is incorporated by reference in its entirety. In yet another embodiment, Rao-Blackwellised sampling is applied as described in Buntine, W., et al., *Applying Discrete PCA in a Data Analysis*, Technical Report 2004-11, Helsinki Institute for Information Technology, 2004 which is incorporated by reference in its entirety.

Figure 8:
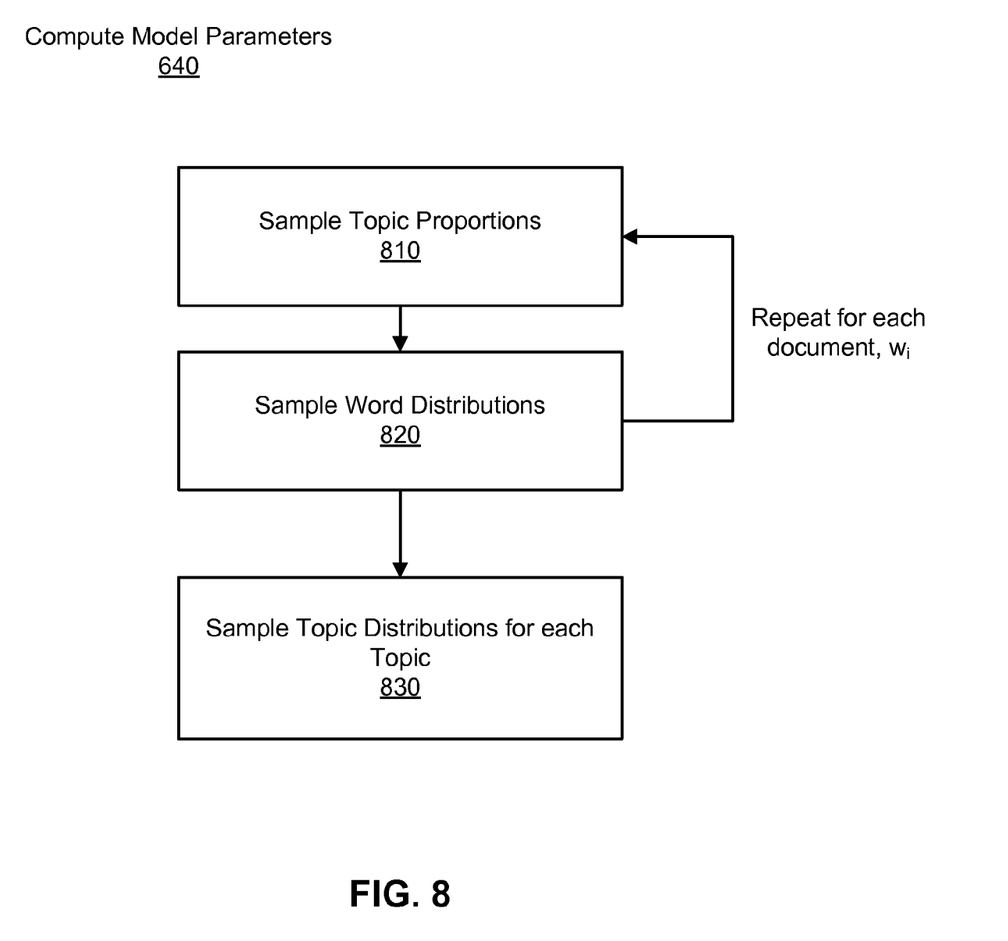
FIG. 8 is a flow diagram illustrating a method for computing model parameters for a probabilistic model used in human detection and pose classification in accordance with one embodiment of the present invention.

FIG. 8 illustrates an example embodiment of computing the model parameters by a method similar to the Gibbs sampling method. For each document $w_i=(w_{i,1}, \ldots, w_{i,W})$, the topic proportions, $\theta^{(i)} \sim p(\theta|w_i, \alpha, \beta)$ are first sampled 810 where $\alpha$ is the parameter of the prior distribution on topic proportion $\theta$. $\beta$ is a W×K matrix of topic distributions $\beta_1, \ldots, \beta_k$, where element $\beta_{jk}$ is the relative frequency of word j in topic k. $\theta^{(i)}$, thus describes the proportion of a topic that contributes to a given document $w_i$. Next, the word distributions, $v_j^{(i)} \sim \text{Multinomial}(\beta_j \theta^{(x)}, w_{i,j})$ are sampled 820. Here, $w_{i,j}$ is the number of times word j appears in document i, and $v^{(i)}$ is a W×K word count matrix for document i, where element $v^{(i)}_{jk}$ is the number of times word j generated by topic k appears in document i. For each topic k, the topic distributions $\beta_{,k} \sim \text{Dirichlet}(\Sigma_i v_k^{(i)}+\eta)$ are sampled 830 where $\eta$ is the parameter of the prior on topic distributions $\beta$. The process results in generating the model parameters to be used in the testing stage 250. In one embodiment, two models are learned, one for the set of positive images and one for the set of negative images in the set of 2D training images 210. It should again be understood that although the technique is described above using terminology generally related to document analysis, the technique may be applied to image analysis based on the analogy previously described.

Figure 4:
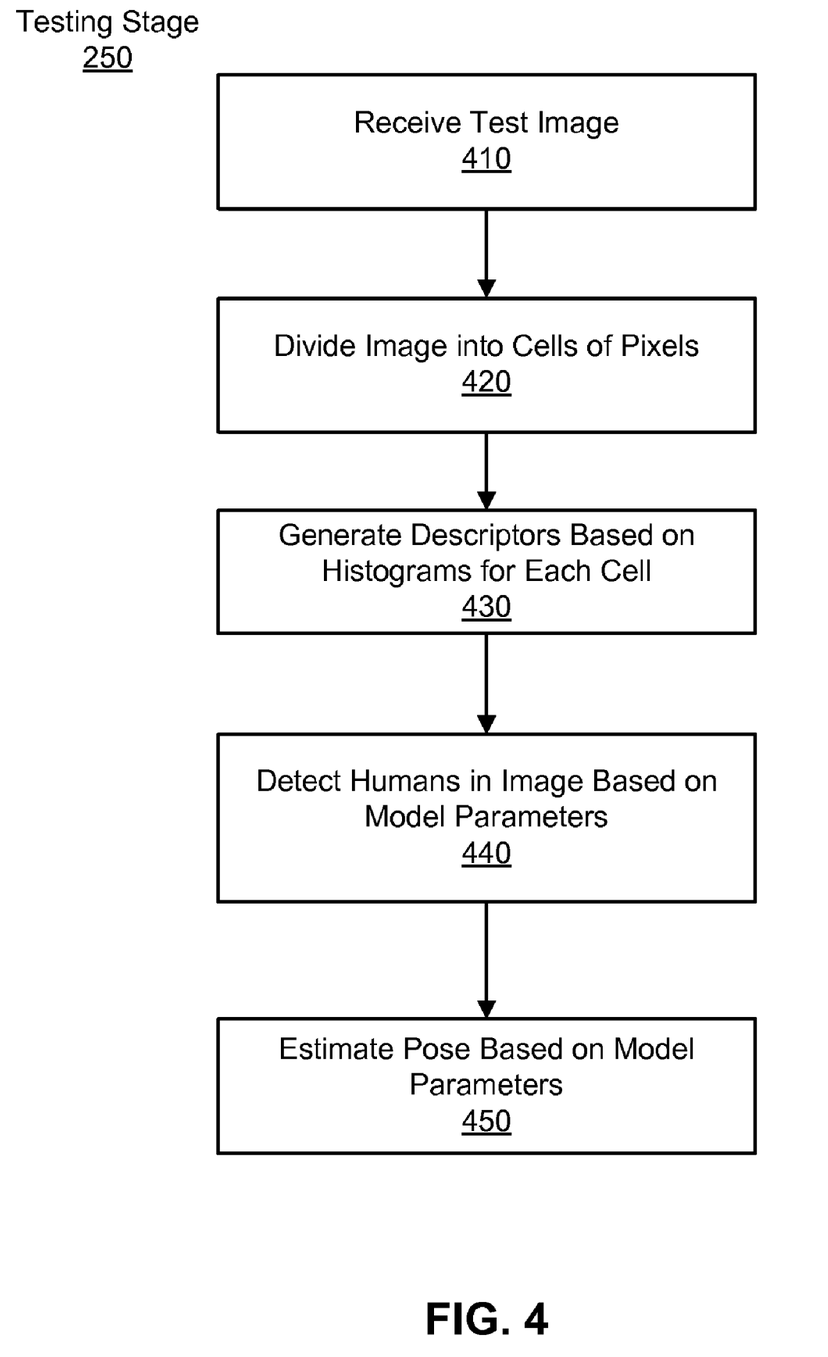
FIG. 4 is a flow diagram illustrating a testing stage for human detection and pose classification of a test image in accordance with one embodiment of the present invention.

Referring back to FIG. 2, the testing stage 250 applies the probabilistic model 230 from the training stage 220 to detect humans in a test image, $I_{new}$, and classify their pose. One embodiment of the testing stage is illustrated in FIG. 4. A test image is received 410 for processing. In one embodiment, the image is decomposed 420 into cells of pixels and a descriptor based on histograms, w(I), is generated 430 in the same manner as in the training stage described above.

Based on the probabilistic model 230, the system determines 440 if any humans are detected in the image using Eq. 2 below:

$$L = \frac{P(w(I_{new})|\text{Human})}{P(w(I_{new})|\text{Background})} \quad (2)$$

The numerator in Eq. 2 may be calculated based on Eq. 1 using model parameters derived from the positive training image set. The denominator in Eq. 2 may be similarly calculated based on Eq. 1 using model parameters derived from the negative training image set. Thus Eq. 2 provides a likelihood ratio, L, for human detection. The likelihood ratio may be compared to a predetermined threshold value to generate the detection decision 270.

The pose is estimated 450 based on the same probabilistic model 230 using model parameters from the positive training image set. From a test image, $I_{new}$, the topic proportions, $\hat{\theta}(I_{new})$ are estimated based on the model parameters as:

$$\hat{\theta}(I_{new}) = \int \theta p(\theta|w(I_{new}),\alpha,\beta) d\theta \quad (3)$$

Pose information can be recovered by matching the new image $I_{new}$ to an image I in the training set. In one embodiment, the matching score is optimally computed as $S_{opt}(I, I_{new}) = P(w(I_{new})|w(I),\alpha,\beta)$opt similarity, i.e., the posterior probability of the test image $I_{new}$ given the training image, I, and the model parameters α, β. In alternative embodiments different solutions can be used. For each training document I in the learning step, the posterior topic proportions $\hat{\theta}(I)$ are computed as in Equation (3). Then the matching score S between $I_{new}$ and I is given by the dot product between the two vectors $\hat{\theta}(I)$ and $\hat{\theta}(I_{new})$:

$$S(I, I_{new}) = <\hat{\theta}(I), \hat{\theta}(I_{new})> \quad (4)$$

This approach represents an efficient method for matching and clustering poses in large datasets by utilizing a dot product between low dimensional unit vectors $\hat{\theta}$.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for human detection and a pose classification comprising:
   using a computer to perform the steps of:
   receiving a probabilistic model derived from a set of training images in at least one of an unsupervised training stage or a semi-supervised training stage;
   generating a set of test image descriptors representing a test image;
   determining a likelihood that the test image contains a human based on parameters of the probabilistic model and the test image descriptors; and
   classifying a body pose of a detected human in the test image based on the test image descriptors and the parameters of the probabilistic model.

2. The method of claim 1 wherein the training stage comprises an unsupervised training stage wherein human poses in the set of training images are unlabeled.

3. The method of claim 1 wherein the training stage comprises a semi-supervised training stage wherein at least one human pose in the set of training images is manually labeled and at least one human pose in the set of training images is unlabeled.

4. A method for human detection and a pose classification comprising:
   using a computer to perform the steps of:
   receiving a training image from a set of training images;
   dividing the training image into at least one cell, each cell having at least one pixel;
   generating a descriptor for each of the at least one cell, the descriptor representing the cell based on a histogram;
   generating a probabilistic model based on the set of training images, the probabilistic model representing statistics of the set of training images characterized in that contributions of each component of the probabilistic model combine additively;
   detecting if a human is present in a test image based on the probabilistic model derived from the set of training images; and
   classifying a pose of a detected human in the test image based on the probabilistic model and the test image.

5. The method of claim 4 wherein generating a probabilistic model comprises computing a first set of model parameters based on a set of positive training images having images of humans and computing a second set of model parameters based on a set of negative training images having images of background scenes.

6. The method of claim 4 wherein the descriptor comprises a histogram of oriented gradients.

7. The method of claim 4 wherein generating the descriptor comprises:
   computing a gradient for each pixel in the cell;
   quantizing each gradient into a bin based on an orientation of the gradient;
   grouping the at least one cell into at least one block of overlapping cells; and
   normalizing the at least one block for brightness and contrast changes.

8. The method of claim 4 wherein generating the probabilistic model comprises applying Latent Dirichlet Allocation to the set of training images.

9. The method of claim 4 wherein generating a probabilistic model comprises learning model parameters based on at least one of Gibbs sampling, Rao-Blackwellised sampling, mean field, or variational inference.

10. A method of human detection and a pose classification comprising:
    using a computer to perform the steps of:
    receiving a probabilistic model derived from a set of training images in at least one of an unsupervised training stage or a semi-supervised training stage;
    receiving a test image;
    representing the test image by a test image descriptor, wherein the test image descriptor is based on training image descriptors used in the training stage;
    computing a ratio based on the test image and the probabilistic model, the ratio comprising a probability that the test image comprises a human;
    comparing the ratio to a predetermined threshold value;
    outputting a human detection signal if the ratio is greater than the threshold value; and
    classifying a pose of a detected human in the test image based on the probabilistic model and the test image.

11. A system for human detection and a pose classification comprising:
- receiving means for receiving a probabilistic model derived from a set of training images in at least one of an unsupervised training stage or a semi-supervised training stage;
- generating means for generating a set of test image descriptors representing a test image;
- determining means for determining a likelihood that the test image contains a human based on parameters of the probabilistic model and the test image descriptors; and
- classifying means for classifying a body pose of a detected human in the test image based on the test image descriptors and the parameters of the probabilistic model.

12. The system of claim 11 wherein the training stage comprises an unsupervised training stage wherein human poses in the set of training images are unlabeled.

13. The system of claim 11 wherein the training stage comprises a semi-supervised training stage wherein at least one human pose in the set of training images is manually labeled and at least one human pose in the set of training images is unlabel.

14. A system for human detection and a pose classification comprising:
- training image receiving means for receiving a training image from a set of training images;
- image dividing means for dividing the training image into at least one cell, each cell having at least one pixel;
- descriptor generating means for generating a descriptor for each of the at least one cell, the descriptor representing the cell based on a histogram;
- model generating means for generating a probabilistic model based on the set of training images, the probabilistic model representing statistics of the set of training images characterized in that contributions of each component of the probabilistic model combine additively;
- detecting means for detecting if a human is present in a test image based on the probabilistic model derived from the set of training images; and
- classifying means for classifying a pose of a detected human in the test image based on the probabilistic model and the test image.

15. The system of claim 14 wherein the model generating means for generating a probabilistic model comprises first parameters computing means for computing a first set of model parameters based on a set of positive training images having images of humans and second parameters computing means for computing a second set of model parameters based on a set of negative training images having images of background scenes.

16. The system of claim 14 wherein the descriptor comprises a histogram of oriented gradients.

17. The system of claim 14 wherein the descriptor generating means for generating the descriptor comprises:
- gradient computing means for computing a gradient for each pixel in the cell;
- quantization means for quantizing each gradient into a bin based on an orientation of the gradient;
- cell grouping means for grouping the at least one cell into at least one block of overlapping cells; and
- normalization means for normalizing the at least one block for brightness and contrast changes.

18. The system of claim 14 wherein the model generating means for generating the probabilistic model comprises Latent Dirichlet Allocation means for applying Latent Dirichlet Allocation to the set of training images.

19. The system of claim 14 wherein the model generating means for generating a probabilistic model comprises parameter learning means for learning model parameters based on at least one of Gibbs sampling, Rao-Blackwellised sampling, mean field, or variational inference.

20. A system for human detection and a pose classification comprising:
- model receiving means for receiving a probabilistic model derived from a set of training images in at least one of an unsupervised training stage or a semi-supervised training stage;
- test image receiving means for receiving a test image;
- test image descriptor means for representing the test image by a test image descriptor,
- wherein the test image descriptor is based on training image descriptors used in the training stage;
- ratio computing means for computing a ratio based on the test image and the probabilistic model, the ratio comprising a probability that the test image comprises a human;
- ratio comparing means for comparing the ratio to a predetermined threshold value;
- signal output means for outputting a human detection signal if the ratio is greater than the threshold value; and
- classifying means for classifying a pose of a detected human in the test image based on the probabilistic model and the test image.

21. A computer program product, comprising a computer readable medium storing computer executable code for human detection and a pose classification, the computer executable code performing steps of:
- receiving a probabilistic model derived from a set of training images in at least one of an unsupervised training stage or a semi-supervised training stage;
- generating a set of test image descriptors representing the test image;
- determining a likelihood that the test image contains a human based on parameters of the probabilistic model and the test image descriptors; and
- classifying a body pose of a detected human in the test image based on the test image descriptors and the parameters of the probabilistic model.

22. The computer program product of claim 21 wherein the training stage comprises an unsupervised training stage wherein human poses in the set of training images are unlabeled.

23. The computer program product of claim 22 wherein the training stage comprises a semi-supervised training stage wherein at least one human pose in the set of training images is manually labeled and at least one human pose in the set of training images is unlabeled.

* * * * *